(12) United States Patent
Sejourne

(10) Patent No.: US 8,544,635 B2
(45) Date of Patent: Oct. 1, 2013

(54) SEPARATOR WITH PEDAL

(75) Inventor: Jerome Sejourne, Saint-Diery (FR)

(73) Assignee: Interroll Holding AG (CH)

( * ) Notice: Subject to any disclaimer, the term of this patent is extended or adjusted under 35 U.S.C. 154(b) by 0 days.

(21) Appl. No.: 13/455,791

(22) Filed: Apr. 25, 2012

(65) Prior Publication Data
US 2012/0273327 A1 Nov. 1, 2012

(30) Foreign Application Priority Data
Apr. 26, 2011 (EP) .................................. 11290201

(51) Int. Cl.
*B65G 13/06* (2006.01)

(52) U.S. Cl.
USPC ................................ 198/781.05; 198/781.06

(58) Field of Classification Search
USPC .................. 198/781.05, 781.06, 460.1, 345.3
See application file for complete search history.

(56) References Cited

U.S. PATENT DOCUMENTS

| | | | | |
|---|---|---|---|---|
| 3,768,630 A | * | 10/1973 | Inwood et al. ........... | 198/781.06 |
| 5,316,130 A | * | 5/1994 | Heit et al. ............... | 198/781.06 |
| 5,348,139 A | * | 9/1994 | Szarkowski et al. ..... | 198/781.05 |
| 5,806,661 A | * | 9/1998 | Martin et al. ............ | 198/781.06 |
| 5,823,319 A | * | 10/1998 | Resnick et al. .......... | 198/781.06 |
| 5,906,267 A | * | 5/1999 | Heit et al. ................ | 198/781.05 |
| 6,234,292 B1 | * | 5/2001 | Schut ........................ | 198/463.6 |
| 7,607,530 B2 | * | 10/2009 | Ueno et al. ................ | 198/345.3 |

FOREIGN PATENT DOCUMENTS

| | | |
|---|---|---|
| DE | 39 10 519 | 10/1990 |
| EP | 1 897 823 | 3/2008 |
| FR | 2 564 809 | 5/1984 |

* cited by examiner

*Primary Examiner* — James R Bidwell
(74) *Attorney, Agent, or Firm* — Gerald E. Hespos; Michael J. Porco; Matthew T. Hespos

(57) ABSTRACT

A conveyor for conveying loads along a conveying direction includes a frame (3) arranged in the conveying direction, a plurality of rollers (2) mounted in the frame (3) rotatable in the conveying direction (C), a trigger pedal (11) movable between an active position and a triggered position, a separator stop (12), and a coupling (13) between the trigger pedal (11) and the separator stop (12) for transmitting a movement applied to the trigger pedal (11) to the separator stop (12). The trigger pedal (11) is one-sided tiltable out of a substantially parallel to the rollers (2) arranged position.

5 Claims, 3 Drawing Sheets

SEPARATOR WITH PEDAL

BACKGROUND OF THE INVENTION

1. Field of the Invention

The invention relates to a conveyor comprising a trigger pedal for a separator stop.

2. Description of the Related Art

Conveyors are commonly used for the storage of pallets or boxes in gravity or dynamic storage. Dynamic storage facilities are made of chutes fitted with rollers or cylinders mounted parallel to one another on beams forming a frame which is tilted from its upstream to its downstream section. These rollers and/or cylinders determine a raceway on which the loads, generally handling pallets, are placed for storage.

In order to suppress the problems associated with the extraction of the loads located at the lower portion of the storage chute, and notably that of the pressure exerted onto the end load by the accumulation of the upstream loads, a load separator device is commonly used at the level of the downstream end of the chute. This device is suited to isolate at least the first load, located downstream on the facility, with respect to the other loads which are waiting upstream, in order to allow smooth extraction of this first load, without causing any problems, using for instance a fork lift.

These separator devices comprise a pedal and a stop, interconnected by a pole or a tie-shaped linking rod as coupling. The pedal has been accommodated at the end of the chute and is designed to be actuated by the downstream load. The stop is used to retain the upstream loads in order to separate them from the load located at the downstream end. This stop is brought into active separating position by the pedal when the latter is actuated by the end downstream load and it is deactuated when said downstream load is removed. The removal allows the following load take its place at the end of the chute and actuates, in turn, the pedal as well as the retaining stop for the other loads.

The trigger pedal is movable between its active and its triggered position and needs to be sturdily build to stay functional during long term use.

The document EP 1 897 823 describes a trigger pedal for a conveyor consisting of three rollers mounted in a pivotable pedal frame. In the triggered position, the pedal frame is aligned parallel to and in the frame formed by the beams of the conveyor, while the three rollers of the trigger pedal are aligned parallel to the other rollers of the conveyor. The trigger pedal is movable into its active position in that the pedal frame is pivoted diagonal to the conveying direction so that the three rollers of the trigger pedal stay parallel to the other rollers, but protrude over the other rollers. The pedal frame together with the three rollers form an element sturdy enough to endure the stress of loads pushing the trigger pedal down. This trigger pedal consists of a plurality of different components.

It is an object of the invention to provide an alternative and improved trigger pedal for a separator stop of a conveyor.

SUMMARY OF THE INVENTION

According to one aspect of the invention, a conveyor for conveying loads along a conveying direction comprises a frame arranged in the conveying direction and a plurality of rollers mounted in the frame rotatable in the conveying direction. To provide a separating function, the conveyor further comprises a trigger pedal movable between an active position and a triggered position, a separator stop, and a coupling between the trigger pedal and the separator stop for transmitting a movement applied to the trigger pedal to the separator stop. The active position is the position of the trigger pedal in which it is ready to be moved into the triggered position when triggered. The movement out of the active position is caused by a load moving along the conveyor and pressing the trigger pedal down by its weight. As long as the load is arranged on the trigger pedal, the trigger pedal itself stays in the triggered position.

The trigger pedal is one-sided tiltable out of a substantially parallel to the rollers arranged position. This can be accomplished by arranging the trigger pedal so that one end of the trigger pedal is untiltable mounted to the frame and the other end of the trigger pedal is tiltable. The trigger pedal itself is arranged diagonal to the axis of rotation of the rollers in its active position.

It is known by the prior art to tilt trigger pedals on both sides into the active position, so that the trigger pedal is substantially parallel to the axis of rotation of the rollers both in active and in triggered position.

Compared to the trigger pedals known by the state of the art, the trigger pedal of the conveyor according to the invention is arranged at a limited height in its active position compared to the known trigger pedals, since only one end of the trigger pedal protrudes into the conveying area while the other end will stay out of the conveying area. This results in a limited average height of the trigger pedal that causes the trigger pedal to be less vulnerable during long-term use.

Also, such a trigger pedal forms a very compact part of the conveyor, wherein a damaged trigger pedal can easily be exchanged and is less expensive than the known trigger pedals.

Also, the untiltable end of the trigger pedal can be fixed to the frame of the conveyor like the other rollers, while only the tiltable end of the trigger pedal needs a special tiltable end. This provides a financial and an assembly advantage over the state of the art, since the special tiltable mounts usually require more parts and are more complicated to assemble.

The fixation of one end of the trigger pedal with the frame of the conveyor provides an improved stability.

In an embodiment of the invention, the movement of the trigger pedal between the active and the triggered position consists of a movement of the tiltable end in a lateral direction with respect to an axis of rotation of the rollers. The movement also comprises a component pointing out of the plane in which the axes of the rollers are arranged. Thus, the movement of the trigger pedal can be caused by the weight of a load moving along the conveyor.

Advantageously, the trigger pedal is arrangable along an arranging direction, and the arranging direction in the active position is titled by an angle between 1° and 5°, in particular between 2° and 4°, to the arranging direction in the triggered position. Such a slight tilt or deflection is sufficient for the trigger pedal to be triggered by a load moving along the conveyor.

An object being arrangable along a given direction means that the object comprises a substantially long form and can therefore be placed so that it extends along the given direction. The arranging direction of a trigger pedal in form of a single roller is the direction in which the axis of the roller is aligned.

In an embodiment, the trigger pedal is arranged parallel to the plurality of rollers in the triggered position. Thus, it can have the function of a roller in its triggered position, since this is the position a load will usually be pressing the trigger pedal down to. This is especially advantageous when the trigger pedal is a single roller. Then, the trigger pedal in form of a roller is arranged so that it can rotate in conveying direction when it is in its triggered position.

In the following, the subject-matter will be described by way of example without limitation of the general inventive concept, with the aid of embodiments with reference to the drawings to which attention is drawn concerning the disclosure of all details of the invention not described more explicitly in the text. Some features shown in the different embodiments can be used in the implementations shown in other embodiments. Same reference signs used in the figures show similar features in the embodiments, as shown by

DETAILED DESCRIPTION OF THE PREFERRED EMBODIMENTS

Figure 1A:
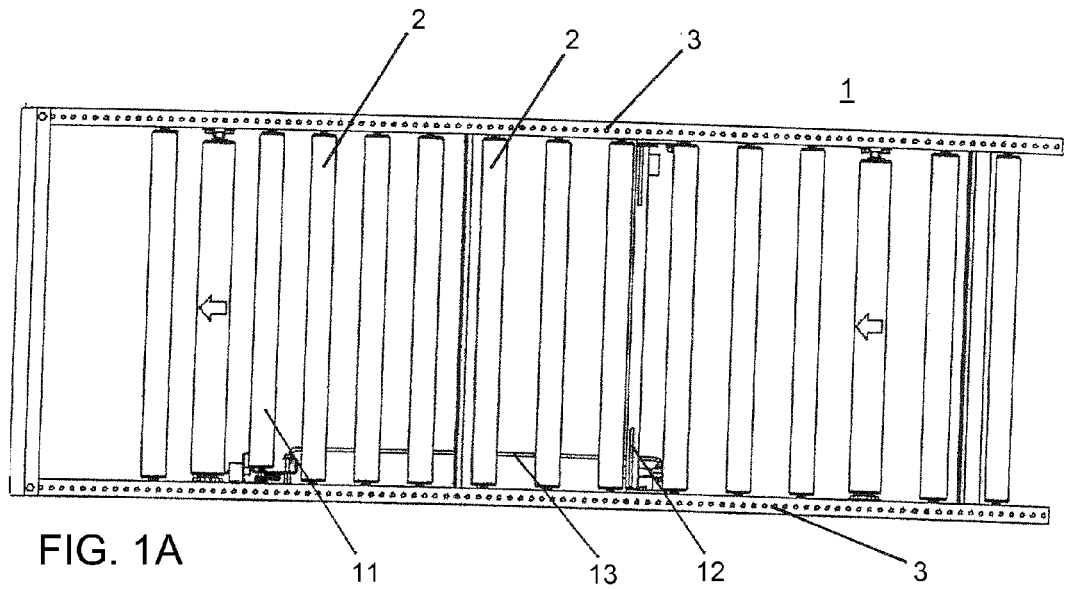
FIG. 1A is a diagrammatic top-view of a possible embodiment of the separator device implemented in a conveyor.

FIG. 1A shows a diagrammatic top view of a conveyor 1 that can be used as storage chute in dynamic storage facilities. Two beams 3 are arranged parallel to each other in a direction by which loads or goods can be transported. They form a frame and the side boundary of the conveyor and comprise a fixed position. Multiple rollers or cylinders 2 are arranged substantially perpendicular to the beams 3 to carry and transport goods or loads (goods or loads not shown in FIG. 1A). The rollers 2 are mounted rotatable around their axes to transport the loads.

Some of the rollers 2 (in FIG. 1A the rollers marked with an arrow) are driven by an engine (not shown) to rotate around their axes and, thus, moving the loads downstream on the conveyor.

FIG. 1A also shows parts of a separator device 10, especially a trigger pedal 11 of the separator device, a separator stop 12, and a coupling 13 to couple the trigger pedal 11 with the stop 12. The trigger pedal 11 consists of a single roller similar to the rollers 2 of the conveyor 1. The trigger pedal 11 is arranged basically parallel to the rollers 2 and basically perpendicular to the beams 3. The stop 12 has the form of a plate or a wall arranged basically parallel to the rollers 2.

Figure 1B:
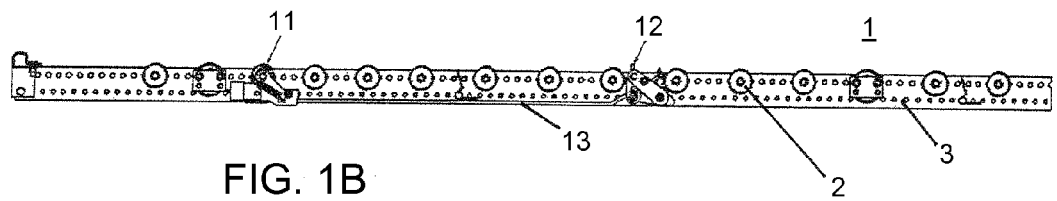
FIG. 1B is a diagrammatic side-view on the conveyor with the separator device of FIG. 1A.

FIG. 1B shows a diagrammatic side-view on the conveyor 1 shown in FIG. 1A. One of the beams 3 is not shown in FIG. 1B to offer a better view of the rollers 2 and the parts of the separator device. The trigger pedal 11 in the form of a pedal roller is shown in a position in which it is arranged level with the rollers 2. Via the coupling 13 in the form of a pole, a stiff wire, or a tie-shaped linking rod, the trigger pedal 11 is coupled to the stop 12 arranged in a conveying position. In the conveying position, the stop 12 is arranged level with the rollers 2 of the conveyor 1.

The trigger pedal 11 comprises spring means (not shown) arranged to push the trigger pedal 11 in a direction perpendicular to both the conveying direction and the direction in which the axes of the rollers 2 are arranged. FIG. 1B shows that the cylinder mantle of the rollers 2 protrude over the top of the beams 3. The top sides of the cylinder mantles of the rollers 2 form a conveying surface for the loads to be conveyed.

The trigger pedal 11 is movable so that it can protrude into the conveying surface formed by the cylinder mantles of the rollers 2. A load moving down the conveyor arriving at the position of the trigger pedal 11 may move on top of the trigger pedal 11 and press the trigger pedal 11 down to hold it level with the other rollers 2. This is the position shown in FIG. 1B. The weight of the load applies a pressure on the trigger pedal 11, pressing it down. The trigger pedal 11 is tiltable, so that by being moved into level with the other rollers 2 (in the triggered position), the trigger pedal 11 pushes the coupling 13 against the conveying direction. The coupling 13 pushes one end of the pivotable mounted stop 12 against the conveying direction, thus moving the stop 12 out of its conveying position into its separating position.

The coupling 13 transfers a movement of the trigger pedal 11 to the separator stop 12.

In the separating position, the stop 12 protrudes into the conveying surface formed by the cylinder mantles of the rollers 2 and prevents loads positioned upstream from passing the position of the stop 12.

Figure 2:
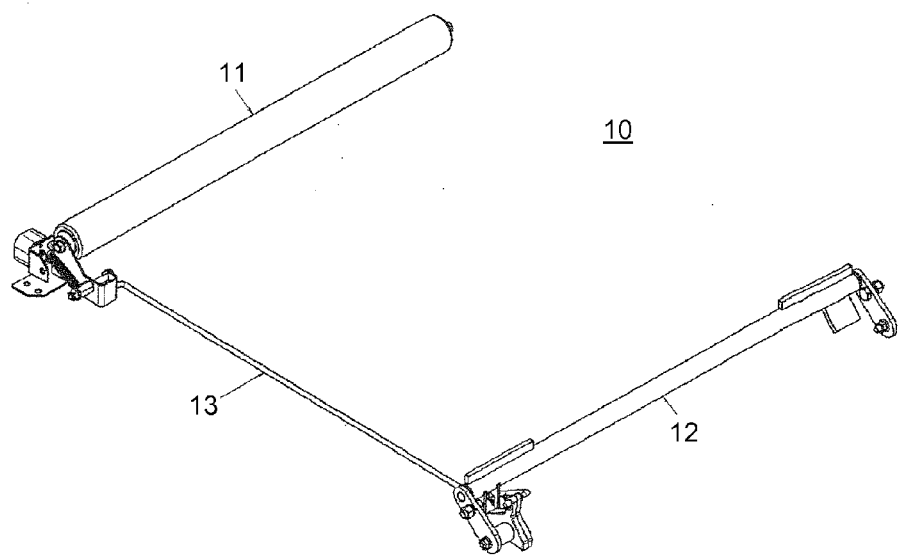
FIG. 2 is a perspective diagram of a separator device.

FIG. 2 shows a diagram of a perspective-view of a separator device 10. FIG. 2 shows the trigger pedal 11 in the form of a pedal roller, the stop 12 in the form of a plate, and the coupling 13 coupling the trigger 11 to the stop 12. A delayer 20 is arranged on the side end of the trigger pedal 11 on which the coupling 13 is connected to. The trigger pedal 11 is a pedal that has the function to unlock and/or release the separator stop 12.

Figure 3A:
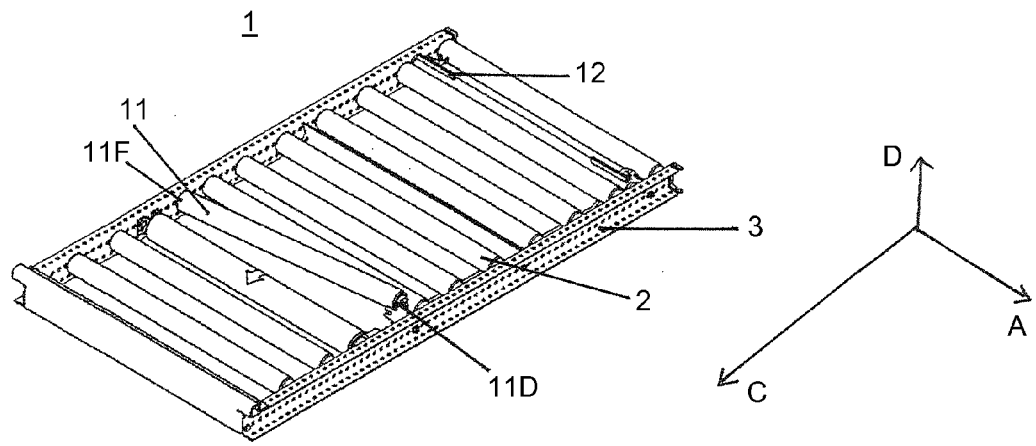
FIG. 3A is a perspective diagram of a conveyor with a trigger pedal in its active position.

FIG. 3A shows a perspective diagram of the conveyor 1. The trigger pedal 11 is a roller similar or identical to the rollers 2 of the conveyor 1. The two ends of the trigger pedal 11 are mounted on the beams 3 that supports the rollers 2.

A first end of the trigger pedal 11 is a fixed end 11F and untiltable. A second end of the trigger pedal 11 is a tiltable end 11D which is shown tilted into its active position.

The conveyor 1 is built to store and transport loads or goods arranged on the rollers 2 in a conveying direction C. Some of the rollers 2 can comprise drives that rotate those rollers around their axle so that the loads are moved. Those rollers are marked in FIG. 1A and FIG. 3A with an arrow. The conveying direction C points from an upstream position of the loads to a downstream position.

The rollers 2 are mounted substantially perpendicular to the conveying direction C between and onto the beams 3 framing the conveyor 1 in an aligning direction A. The axes of the rollers 2 are aligned in the aligning direction so that the cylinder mantles of the rollers 2 are rotatable in conveying direction C to transport the loads.

Substantially perpendicular to the conveying direction C and the aligning direction A, extends a deflecting or tilting direction D. The deflecting direction D extends in a direction defined by the vector product of the conveying direction with the aligning direction A. Depending on the arrangement on the aligning direction A, the deflecting direction D can either be the positive or the negative direction of the vector-product:

$$\vec{D} = \pm \vec{C} \times \vec{A}.$$

The trigger pedal 11 is aligned parallel to the rollers 2 in its triggered position, along the aligning direction A. In its active position, the trigger pedal 11 is tilted by an angle δ in the deflecting direction.

Figure 3B:
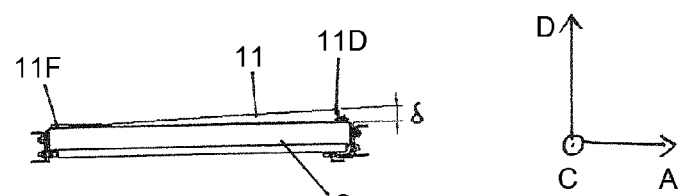
FIG. 3B is a diagram of the conveyor in FIG. 3A as shown against the conveying direction.

FIG. 3B is a diagrammatic view on the conveyor 1 against the conveying direction C, wherein the trigger pedal 11 is in its active position ready to be triggered whenever a load will move downstream on top of the trigger pedal 11. While the fixed-end 11F of the trigger pedal 11 is not tilted in the active position, the tiltable-end 11F of the trigger pedal 11 is tilted by the angle δ in deflecting direction D. The deflecting or tilting angle δ is the angle between the direction of alignment of the trigger pedal 11 in active position and the direction of alignment of the trigger pedal 11 in triggered position (the aligning direction A).

Figure 3C:
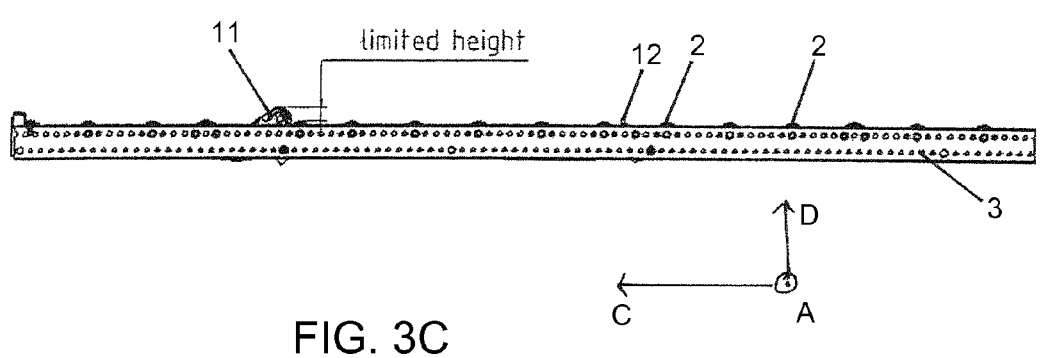
FIG. 3C is a diagram of the conveyor in FIG. 3A as shown perpendicular to the conveying direction.

FIG. 3C shows a diagrammatic view of the conveyor 1 against the aligning direction A. The trigger pedal 11 is tilted by a limited height in deflecting direction D. Since only the tiltable side 11D of the trigger pedal 11 is protruding into the conveying area, the total protrusion into that area is limited compared to a trigger pedal tiltable on both ends. Therefore, the total tilting movement of the trigger pedal 11 is shorter with such a one-sided tiltable trigger pedal. This improves the durability of the trigger pedal 11, since its movement when triggered by loads/goods causes stress on the material.

Figure 4:
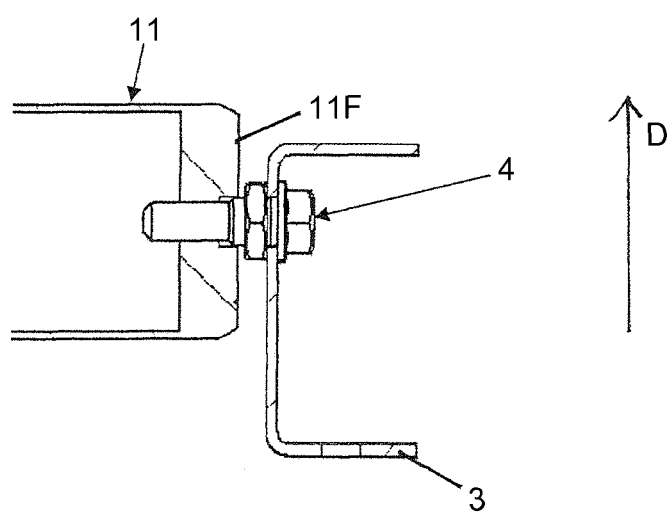
FIG. 4 is a diagram of a fixed-end of a trigger pedal and its attachment to the frame of a conveyor.

FIG. 4 shows a sectional view of the fixed end 11F of the trigger pedal 11. The fixed-end 11F is fixed to one of the beams 3 by a rivet 4 as attachment. The rivet 4 blocks tilting of the fixed-end 11 in the deflecting direction D while allowing enough play so that the tiltable-end 11D (not shown in FIG. 4) can be tilted by the angle δ. The fixed-end 11F is formed circular in its cross section. The rivet 4 engages in the centre of the circular formed fixed-end 11F to allow a rotation of the trigger pedal 11 around its axle. The deflecting angle δ is relatively small, usually between 1° and 5°, preferably approximately 3°. As the attachment of the fixed-end 11F with the beam 3 of the conveyor 1 the same kind of attachment can be used as for the rollers 2. This enables the use of a known attachment without the need to develop a new kind of attachment.

What is claimed is:

1. A conveyor for conveying loads along a conveying direction, comprising:
 a frame (3) arranged in the conveying direction,
 a plurality of rollers (2) mounted in the frame (3) and arranged rotatable in the conveying direction (C),
 a trigger pedal (11) movable between an active position and a triggered position,
 a separator stop (12), and
 a coupling (13) between the trigger pedal (11) and the separator stop (12) for transmitting a movement applied to the trigger pedal (11) to the separator stop (12)
 characterised in that
 one end of the trigger pedal (11) is untiltably (11F) mounted to the frame (3) and the other end of the trigger pedal is tiltable (11D) so that the trigger pedal (11) is one-sided tiltable out of a substantially parallel to the rollers (2) arranged position.

2. The conveyor of claim 1, wherein the movement of the trigger pedal (11) between the active and the triggered position comprises of a movement of the tiltable end (11D) in a lateral direction (D) with respect to an axis of rotation (A) of the rollers (2).

3. The conveyor of claim 1, wherein the trigger pedal (11) is arrangable along an arranging direction, and the arranging direction in the active position is tilted by an angle (δ) between 1° and 5°, to the arranging direction in the triggered position.

4. The conveyor of claim 1, wherein the trigger pedal (11) is arranged parallel to the plurality of rollers (2) in the triggered position.

5. The conveyor of claim 1, wherein the trigger pedal (11) is a roller for the conveyor (1) arranged rotatable in conveying direction (C) in its triggered position.

\* \* \* \* \*